(12) United States Patent
Zeitak (10) Patent No.: US 7,545,744 B2
(45) Date of Patent: Jun. 9, 2009

(54) METHOD AND SYSTEM FOR FAIRLY ADJUSTING BANDWIDTH AMONG DISTRIBUTED NETWORK ELEMENTS

(75) Inventor: Reuven Zeitak, Rehovot (IL)

(73) Assignee: Alcatel, Paris (FR)

( * ) Notice: Subject to any disclaimer, the term of this patent is extended or adjusted under 35 U.S.C. 154(b) by 668 days.

(21) Appl. No.: 11/094,264

(22) Filed: Mar. 31, 2005

(65) Prior Publication Data

US 2006/0221820 A1 Oct. 5, 2006

(51) Int. Cl.
*H04J 1/16* (2006.01)

(52) U.S. Cl. ............ 370/230.1; 370/254; 370/468

(58) Field of Classification Search ......... 370/230–234, 370/389, 465, 468, 235, 229, 236.1, 236.2, 370/241.1, 396, 395.2, 400
See application file for complete search history.

(56) References Cited

U.S. PATENT DOCUMENTS

| | | | | |
|---|---|---|---|---|
| 5,335,224 A | * | 8/1994 | Cole et al. ............... | 370/235 |
| 6,052,361 A | * | 4/2000 | Ansari et al. ............. | 370/232 |
| 6,269,078 B1 | * | 7/2001 | Lakshman et al. ........ | 370/230 |
| 6,400,684 B1 | * | 6/2002 | Benmohamed et al. .. | 370/230.1 |
| 6,512,743 B1 | * | 1/2003 | Fang ......................... | 370/232 |
| 7,284,047 B2 | * | 10/2007 | Barham et al. ............ | 709/224 |

* cited by examiner

*Primary Examiner*—Chirag G Shah
*Assistant Examiner*—Daniel Mitchell
(74) *Attorney, Agent, or Firm*—Sughrue Mion, PLLC (57) ABSTRACT

A method and system for fairly adjusting the bandwidth among distributed network elements (NEs). Load-balancing (LB) packets, carrying designated congestion values (CVs) are sent from each source NE to intermediate NEs along data flows routes. The intermediate NEs stamp each received LB packet with a segment CV, if the segment CV is greater than the designated CV, and forward the LB packet to the next NE, until the packet reaches the respective destination NE, which returns it to the source NE. The CV received at each source NE and the state of an associated channel queue are then used to regulate the channel rate to allow the reduction of traffic load in congested network segments.

21 Claims, 6 Drawing Sheets

METHOD AND SYSTEM FOR FAIRLY ADJUSTING BANDWIDTH AMONG DISTRIBUTED NETWORK ELEMENTS

FIELD OF THE INVENTION

The present invention relates generally to communication networks, and more particularly to systems and methods for load balancing of data traffic in communication networks.

BACKGROUND OF THE INVENTION

Modern communication networks are more diverse and bandwidth-intensive than ever before. High-bandwidth communication networks are in high-demand, as different types of services need to share the same transmission media and thus to share the same bandwidth. Furthermore, modern communication networks must support different types of services differentiated based on some performance characteristics, such as allocated bandwidth, delays and packet losses. A user may purchase a service package (from a service provider) that assures a certain level of performance, usually referred to as quality of service (QoS). A service package is determined by a bandwidth profile and a class of service (CoS). In order to secure sufficient bandwidth, users often contract for discrete channels, each channel capable of handling the greatest expected bandwidth requirement of a respective data flow. A channel is associated with a single link from a source network element (NE) to a destination NE.

Modern networks face a common set of problems, some of which relate to traffic congestion. Traffic congestion may occur in the network's inputs, outputs, or internal nodes. Specifically, input congestion occurs when too much traffic is directed to an input of the network. Internal traffic congestion occurs when there is insufficient throughput bandwidth to handle the routing of packets within the network, and output congestion occurs when too much traffic is directed towards the same network output.

To overcome these problems, load balancing "LB" (or bandwidth management) techniques are disclosed in the related art. These techniques allocate bandwidth for each channel and dynamically adjust the bandwidths of the various services, for the purpose of guaranteeing CoS requirements and maintaining fairness among the various services. The disclosed techniques regulate the traffic rate based on the input rate and the available bandwidth. Other techniques may involve measuring the network congestion, typically using operations and maintenance (OAM) tracers, and adjusting the bandwidth for each channel based on these measurements. Examples of load-balancing techniques are disclosed in U.S. Pat. Nos. 6,690,678, 6,687,228, 6,282,562, 6,011,776, 5,940,372 and 5,815,492.

The shortcoming of prior art solutions is that bandwidth is proportionally adjusted to the existing bandwidth and congestion, and does not take into account other parameters, such as the fairness or the congestion at a channel's scheduler. In addition, some of these solutions are based on a central unit, e.g., a bandwidth management server that periodically determines the level of additional bandwidth that can be allocated or de-allocated for each channel.

Therefore, in the view of the shortcomings introduced in the related art, it would be advantageous to provide an efficient solution for performing load balancing in congested networks.

SUMMARY OF THE INVENTION

According to the present invention, there is provided a method for fairly adjusting bandwidth among distributed source NEs of a communications network comprising the steps of: by each source NE: receiving a common maximum congestion value (CV) from a respective destination NE; calculating a satisfaction value; and adjusting a bandwidth of a group of data flows transmitted through a common congested segment (i.e. intermediate NE) of the network, using the common maximum CV and the respective satisfaction value, thereby providing a bandwidth fairly adjusted among the various distributed source NEs without using an external control unit.

According to one feature of our method for fairly adjusting bandwidth among distributed source NEs of a communications network, the step of receiving a common maximum CV includes generating a segment CV at each intermediate NE, comparing all the segment CVs to determine the common maximum CV, and forwarding the common maximum CV to each source NE through its respective destination NE.

According to another feature of our method for fairly adjusting bandwidth among distributed source NEs of a communications network, the method further comprises the steps of generating load balancing (LB) packets with default CVs at each source NE.

According to yet another feature of our method for fairly adjusting bandwidth among distributed source NEs of a communications network, the generation of a segment CV further includes computing a segment CV in each intermediate NE, comparing the computed CV with the CV received in a LB packet, and replacing the received CV in its respective LB packet with the computed CV if the computed CV is greater, or leaving the received CV unchanged if the computed CV is smaller.

According to yet another feature of our method for fairly adjusting bandwidth among distributed source NEs of a communications network, the computing of the segment CV is based on a NE congestion measurement using a bandwidth counter and a buffer depth.

According to yet another feature of our method for fairly adjusting bandwidth among distributed source NEs of a communications network, the step of calculating a satisfaction value includes calculating a value based on queue occupancy.

According to yet another feature of our method for fairly adjusting bandwidth among distributed source NEs of a communications network, the step of adjusting a bandwidth includes calculating a new bandwidth $BW_{new}$ using an existing bandwidth $BW_{current}$ and a function $F[CV, Sat]$ of the maximum CV and the satisfaction value, as explained in more detail below.

According to yet another feature of our method for fairly adjusting bandwidth among distributed source NEs of a communications network, the new bandwidth is calculated according to the formula $BW_{new} = BW_{current} + F[CV, Sat]$, as explained in more detail below.

According to the present invention there is provided in a communications network carrying a plurality of data flows through intermediate network elements (NEs) along routes, each route connecting a source NE to a destination NE, a system for fairly adjusting bandwidth among distributed source NEs comprising at least one bandwidth adjustment module included in each source NE and operative to adjust the bandwidth of a group of data flows, and at least one common intermediate NE shared by at least two of the routes that provides a maximum congestion value to each bandwidth adjustment module to serve in the adjustment, whereby the fair adjustment of bandwidth among the various distributed source NEs is performed without using an external control and without communication between the source NEs.

According to one feature in the system of the present invention, each bandwidth adjustment module includes a channel module operative to execute all tasks related to balancing congestions in the network.

According to another feature in the system of the present invention, the tasks include calculation of a satisfaction function and a stress function used in the bandwidth adjustment.

According to the present invention there is provided a method for fairly adjusting bandwidth among distributed NEs that include a first plurality of source NEs and a second plurality of destination NEs, each source and destination NE connected by a route through a set of intermediate NEs, the method comprising the steps of: generating, at each source NE, LB packets that include each a default CV, the LB packets sent to a respective destination NE through the intermediate NEs of a respective route; generating at each intermediate NE along the respective route a segment CV; determining a common maximum CV of the segment CVs; and allocating at each source NE a new bandwidth, using the common maximum CV and a satisfaction value calculated at each source NE.

According to one feature in the method for fairly adjusting bandwidth among distributed NEs that include a first plurality of source NEs and a second plurality of destination NEs, the step of generating a segment CV includes generating a designated segment CV that replaces a received LB packet CV if a CV computed at the intermediate CV is larger than the received LB packet CV.

According to another feature in the method for fairly adjusting bandwidth among distributed NEs that include a first plurality of source NEs and a second plurality of destination NEs, the step of generating a segment CV includes leaving a received LB packet CV unchanged if a CV computed at the intermediate CV is smaller than the received LB packet CV.

BRIEF DESCRIPTION OF THE DRAWINGS

FIG. 3 shows in (a) a non-limiting flowchart and in (b) a detailed flowchart of the load-balancing method in accordance with an exemplary embodiment of the present invention;

DETAILED DESCRIPTION OF THE INVENTION

The present invention discloses a load-balancing system and method for fair adjustment of bandwidth among distributed network elements. Furthermore, for each channel, the method dynamically allocates bandwidth to services (i.e., groups of data flows) while assuring class of service requirements and maintaining fairness among the various services. The traffic rate is adjusted in proportion to the network congestion, existing bandwidth and queue occupancy.

Figure 1:
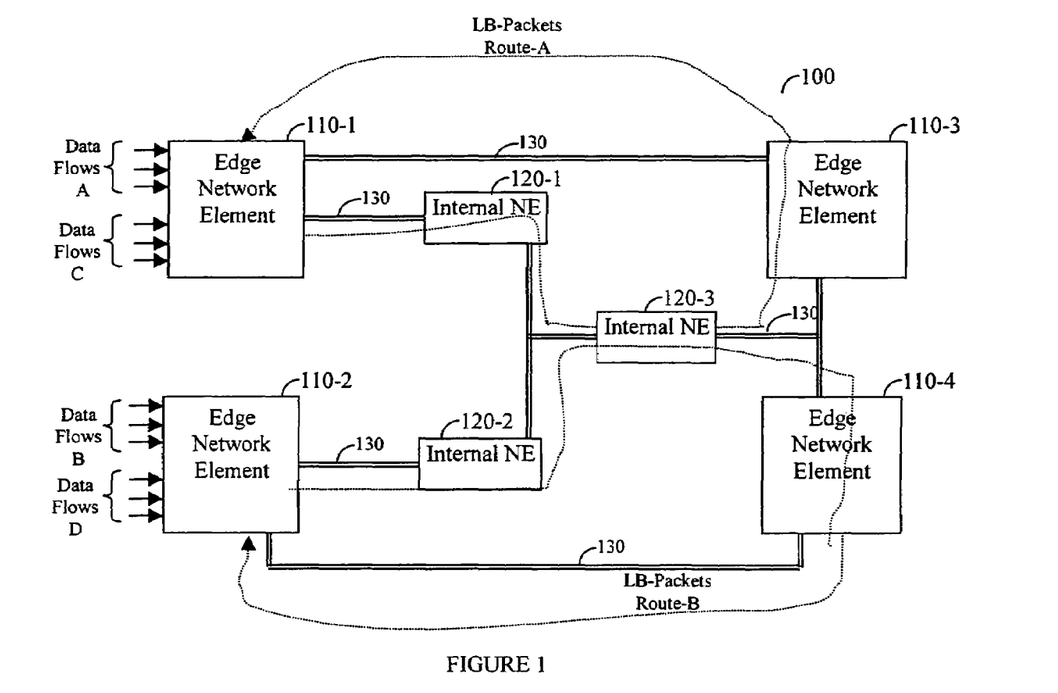
FIG. 1 is an exemplary illustration of a communication network used for describing the principles of the present invention.

FIG. 1 shows an exemplary illustration of a communication network 100 used for demonstrating the principles of the present invention. Network 100 includes exemplarily four edge network elements 110-1, 110-2, 110-3, and 110-4, connected to internal NEs 120-1, 120-2, and 120-3. NEs 110 and 120 communicate through a communication link 130. In network 100 two groups of data flows, A and B, having the same CoS, are respectively transmitted through routes A and B. Route-A is established from NE 110-1 (which serves as a source NE) to NE 110-3 (which serves as a destination NE) through internal NEs 120-1 and 120-3. Similarly, route-B is established from source NE 110-2 to destination NE 1104 through internal NEs 120-2 and 120-3. Note that NE 120-3 is common to both routes. Data flows are data packets or service frames that have been analyzed for the purpose of determining the process flow to which they belong, the way the packets or frames should be processed, and the destination to which a packet or frame should be routed. An exemplary process flow may be a series of packets, all belonging to the signaling of a file transfer protocol (FTP). Often the data flows include data of different CoS priority, ranging from high priority data, e.g., voice communications, which cannot tolerate significant delays, to low priority data, e.g., file transfers. Network 100 may be, but is not limited to, a multi-protocol label switching (MPLS) network, an asynchronous transfer mode (ATM) network and the like. Each of sources NEs 110-1 and 110-2 may include a plurality of bandwidth adjustment modules, each of which is capable of handling a single group of data flows.

Figure 2:
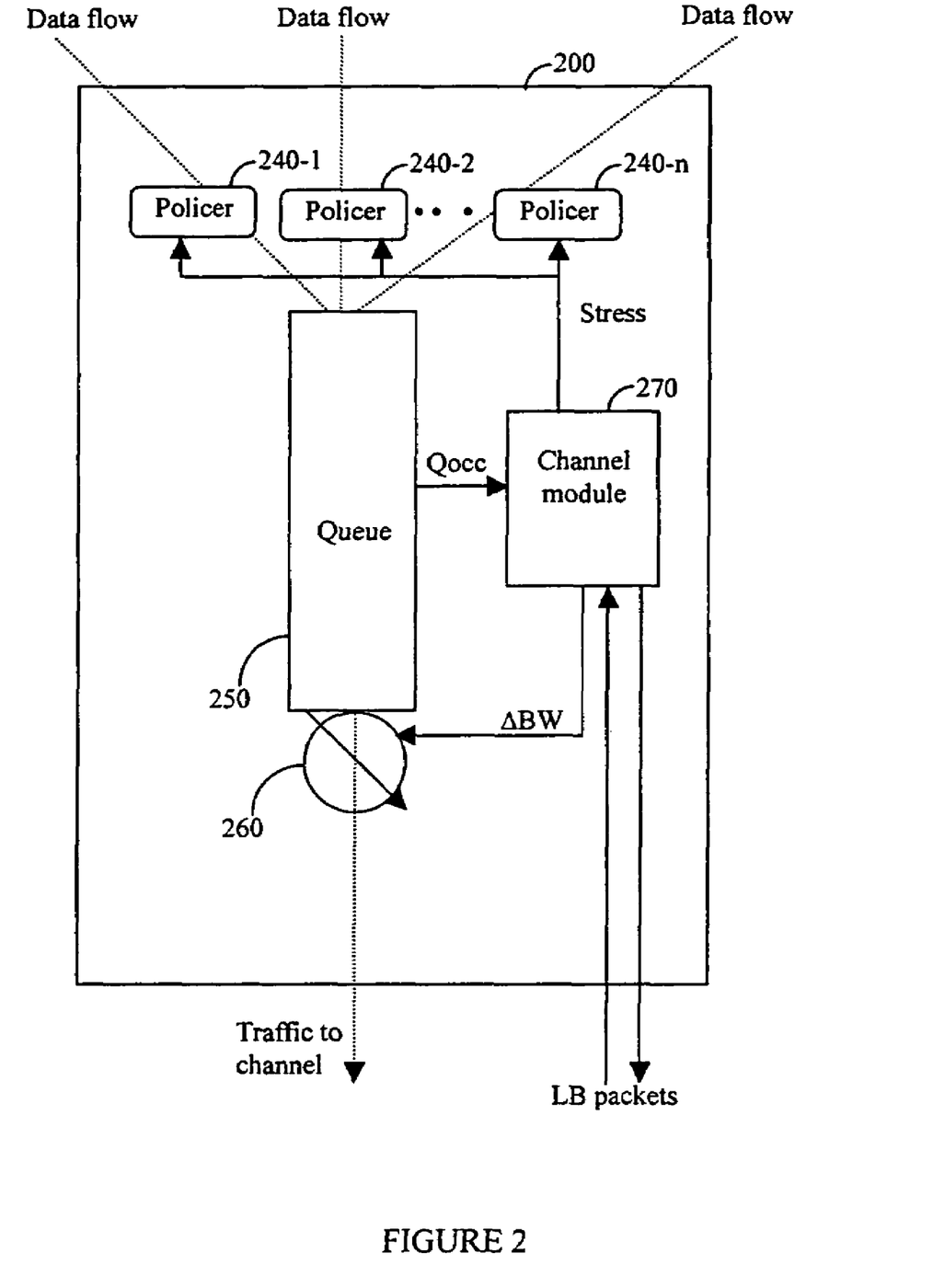
FIG. 2 is an exemplary block diagram of a bandwidth adjustment module in a source network element.

FIG. 2 shows an exemplary block diagram of a bandwidth adjustment module 200 in a source NE. Bandwidth adjustment module 200 includes at least one policer 240, (preferably a plurality of policers 240-1 through 240-$n$) connected to a single queue 250, a shaper 260, and a channel module 270. Each policer 240 is parameterized by an input rate (InRate) and an excess information rate (EIR). Each policer is capable of handling a single data flow and of computing a new EIR to be enforced, namely packets of a respective data flow are transferred from a policer 240 to queue 250 at a rate equal to the newly computed EIR. The new EIR is computed according to the following equation:

$$EIR_{new} = \min[\text{InRate}, \text{stress} * EIR_{current}] \quad (1)$$

where the "stress" parameter represents the occupancy of queue 250 (hereinafter the "Qocc value") and is determined by a stress function, as described in more detail below. $EIR_{current}$ is the EIR currently enforced by a policer 240-1. An example for a policer 240 may be found in PCT application No. PCT/112004/00781 to R. Zeitak, titled "A Policer and Method for Resource Bundling", assigned to a common assignee and hereby incorporated by reference.

Channel module 270 executes all tasks related to balancing congestions in network 100. These tasks include queuing and de-queuing packets received from policers 240, computing a satisfaction function and a stress function, generating load balancing (LB) packets, transferring LB packets to network 100, receiving LB packets from network 100, and computing $BW_{new}$. These tasks will be described in greater detail below. Shaper 260 regulates the channel rate based on the computed $BW_{new}$ value.

As mentioned above, channel module 270, which is an inventive element of the system of the present invention, computes the stress and satisfaction functions. The satisfaction is defined as a non-increasing function of the stress value. In a preferred embodiment of the present invention, these functions are based on the Qocc value of queue 250. In this embodiment, the stress function is a monotonic non-increasing function of Qocc, which is high for low Qocc values and which decreases as the Qocc increases. The satisfaction function is a monotonic non-decreasing function of Qocc, negative for low Qocc values and increasing as the Qocc increases. In another preferred embodiment of the present invention, the stress value may be considered as the factor by which all EIRs must be reduced in order to prevent a scheduler overflow. In one embodiment of the present invention, this factor can be computed for any weighted fair queuing scheduler as the ratio between the utilization rates of backlogged data flows to their configured EIRs.

Figure 4:
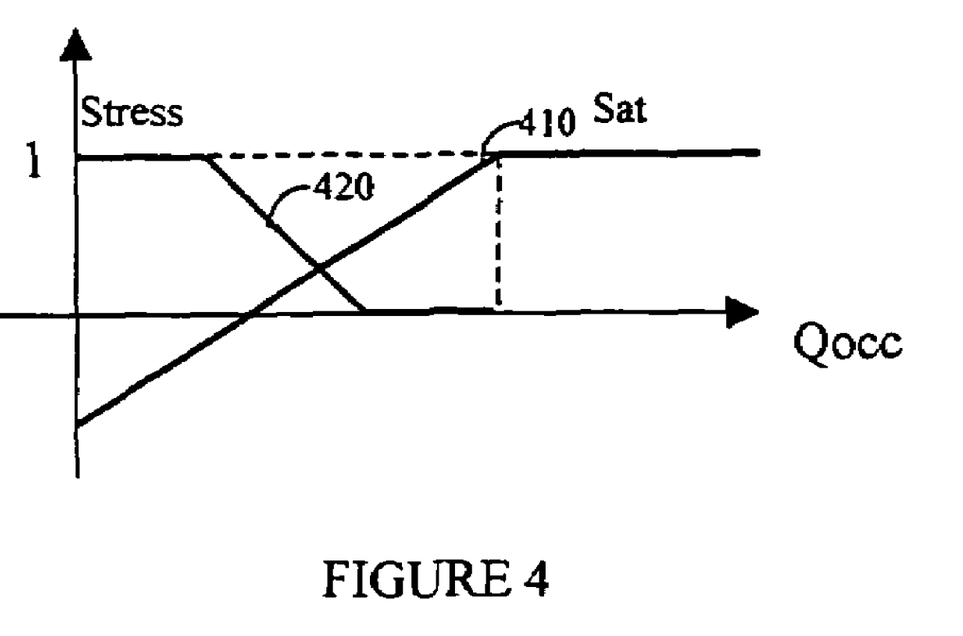
FIG. 4 is a non-limiting and exemplary graph of the satisfaction and stress functions.

Non-limiting and exemplary graphs of a satisfaction function 410 and a stress function 420 are provided in FIG. 4. As seen, the stress value ranges between 0-1 and the satisfaction ("Sat") value ranges from a predefined negative value 'a' to 1. The stress value is provided as an input to each policer 240.

A key advantage of our load-balancing method is its ability to fairly balance multiple routes of data flows that share the same congested segment (bottleneck), without requiring the source NEs of these routes to communicate with each other. For example, in FIG. 1, the bottleneck is NE 120-3. The basic criterion for fairness is that data flows sustained in the same network segment are treated the same, independent of their source or destination NEs. Furthermore, the main goal of the present load balancing method is to assure that data flows that share the same bottleneck are given as much bandwidth as possible, with stress values as equal as possible. This goal is fulfilled by adjusting the bandwidth of each data flow (i.e. at policers 240) according to Equation (1) hereinabove, and by adjusting the bandwidth of groups of data flows transmitted through a common route (i.e., at shaper 260) proportionally to the existing bandwidth, the Sat value (provided by the satisfaction function) and the network congestion, so that all channels (sharing the same bottleneck) will have the same stress value. The stress value is independently determined for each channel, where channels having the same stress value will behave in a fair queuing manner.

The congestion of a network segment (e.g. an internal NE 120) is represented by an absolute congestion value (CV). The CV is determined by each NE along the route, where the maximum measured CV is sent back to channel module 270 at the source NE. In this way, multiple channels sharing the same most congested segment (bottleneck) receive the same maximum CV. The CVs are carried over the network by means of load balancing (LB) packets, transmitted through the route of each channel. As a non-limiting example one can consider route-A and route-B shown in FIG. 1, both sending data and LB packets through NE 120-3. The CVs measured by NE 120-1, NE 120-2, and 120-3 are exemplarily 1, 2 and 5 respectively. The measured CV of NE 120-3 is therefore the maximum CV and hence NE 120-3 is considered the most congested segment. Thus this maximum CV will be provided to both sources NE 110-1 and 110-2.

Figure 3A:
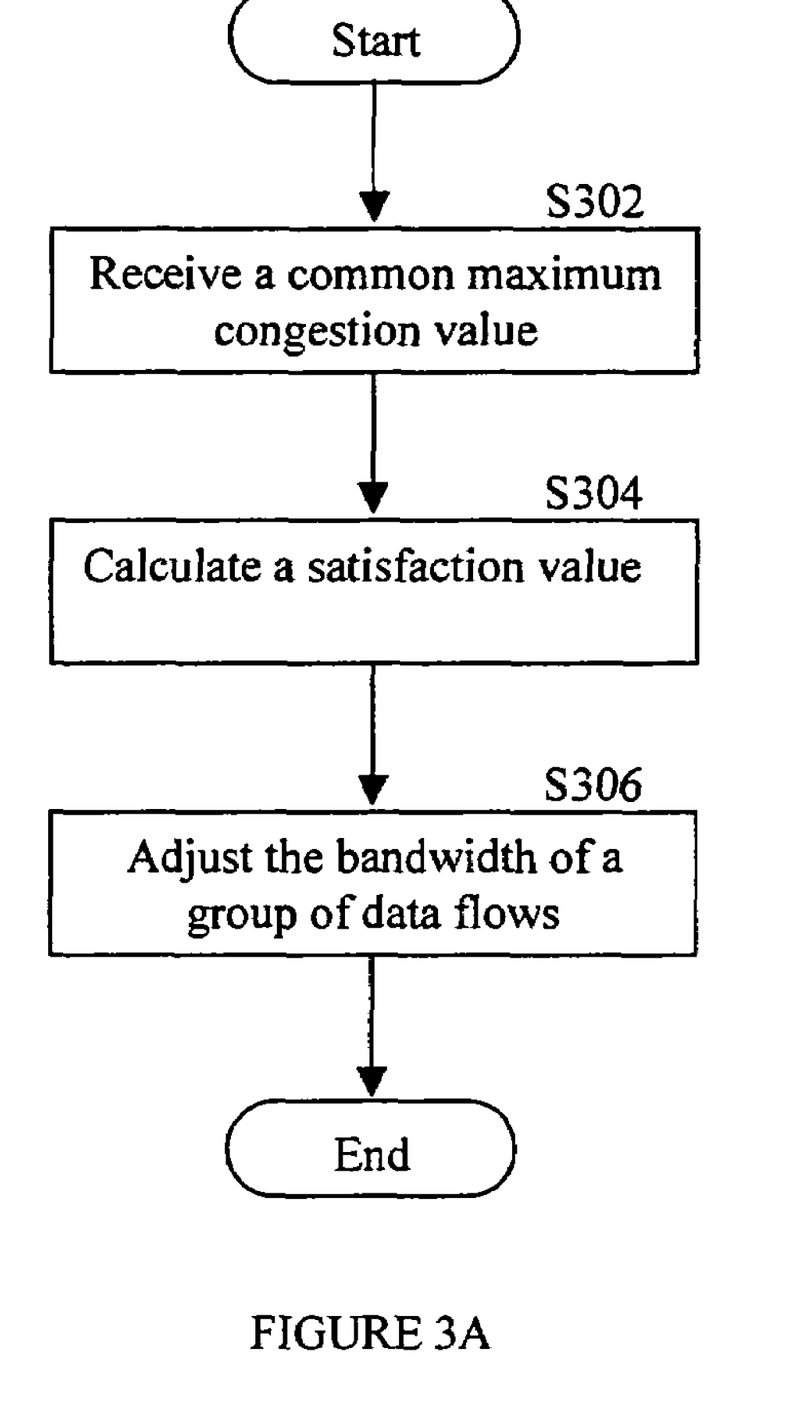
Figure 3B:
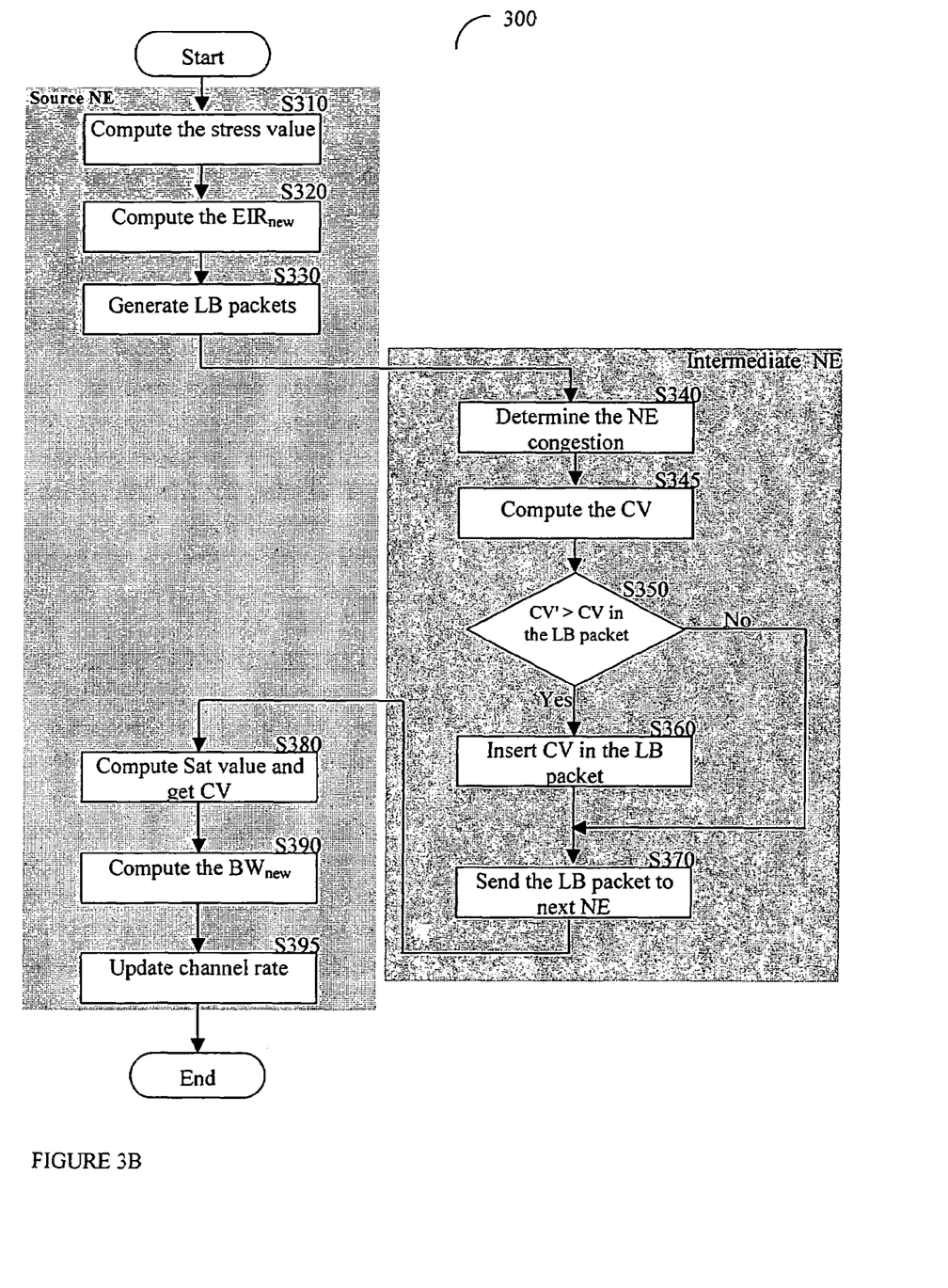

FIG. 3A shows a non-limiting flowchart of the basic steps, and FIG. 3B shows a more detailed flowchart of the load-balancing method, in accordance with an exemplary embodiment of the present invention. FIG. 3A describes the basic steps taken by each source NE: in step S302, the source NE receives a common maximum congestion value from a destination NE of its respective route. The maximum CV will be received from the most congested segment (intermediate NE) that is common to a plurality of routes. Each intermediate NE computes its "segment" CV, as described in more detail below, but only the maximum CV is sent to the source NE. In step S304, each source NE calculates a satisfaction value, as described in more detail below. In step S306, each source NE adjusts the bandwidth of a group of the data flows transmitted by it through the common congested segment, using the common maximum congestion value and the respective satisfaction value. A key advantage of the method of the present invention is that this fair adjustment of the bandwidth among the various distributed NEs is performed without using an external control unit, and without communication between the different source NEs while assuring the same stress value among channels sharing the same bottleneck.

Figure 5A:
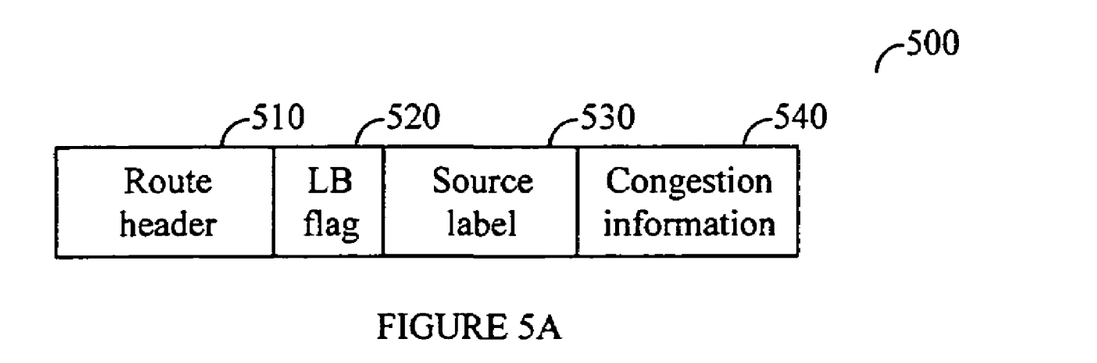
FIG. 5 is an exemplary format of a LB packet.

FIG. 3b shows the steps of the method in more detail. In step S310, the stress value is computed using the Qocc based stress function. The stress value may be sent to each of policers 240 for computing and enforcing the new EIR on incoming packets as shown in step S320. In step S330, each source NE generates and sends LB packets along each of its routes. A LB packet is generated by channel module 270 at a rate proportional to the input rate. That is, a channel having a higher input rate generates more LB packets than a channel with a lower rate. Each LB packet is sent to network 100 after a pre-configured number of transmitted bytes. FIG. 5A shows an exemplary format of a LB packet 500 that comprises a route header 510 including routing information, a LB flag 520, a source label 530, and a congestion section 540 including a CV and the NE associated with that CV. LB flag 520 indicates that this packet contains operations and maintenance (OAM) information. Source label 530 is the label (or address) of the source NE. The CV in LB packets sent from a source NE is set with a default value, and referred to herein as a "default CV".

Returning to FIG. 3B, in step S340, an intermediate NE that receives a LB packet determines its own congestion by measuring its capacity, i.e., the utilized bandwidth and number of packets waiting to be transmitted. In step S345, the segment CV is determined by translating the measured congestion to an absolute value. In order to decide which of several congested segments is the most congested, all NEs use the same scale to translate the measured congestion to a respective segment CV. In an embodiment of this invention, the NE's congestion is measured using two counters, a bandwidth counter and a buffer depth that reside in the same NE. The values of these counters are mapped to a segment CV using a two-dimensional table. The mapping is performed in a way that a higher CV is given to both high bandwidth and buffer depth measures and a lower CV is given to low bandwidth or low buffer depth measures. Table 1 provides an example for mapping congestion values:

TABLE 1

| | Buffer fill (depth) 70% | Buffer fill (depth) 80% | Buffer fill (depth) 90% | Buffer fill (depth) 100% |
|---|---|---|---|---|
| Bottleneck utilization 70% | 0 | 1 | 1 | 1 |
| Bottleneck utilization 80% | 1 | 2 | 3 | 4 |
| Bottleneck utilization 85% | 1 | 3 | 3 | 5 |
| Bottleneck utilization 100% | 1 | 4 | 6 | 6 |

Figure 5B:
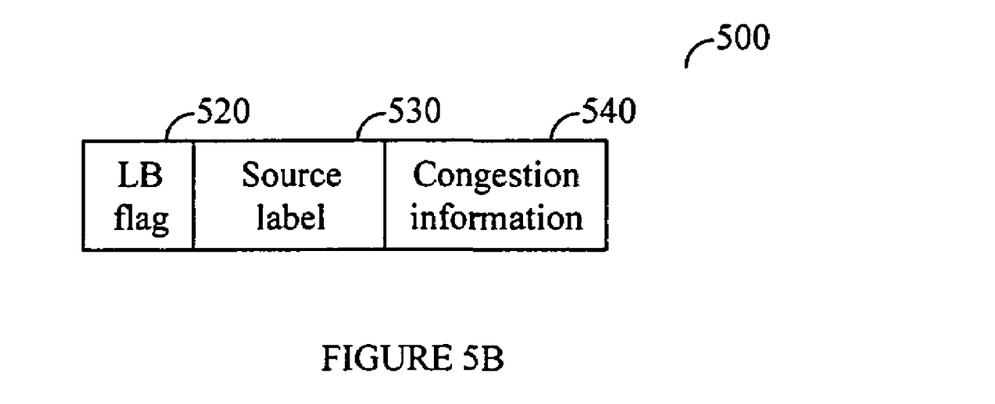

In step S350, once the segment CV is determined, it is checked as whether the new computed CV is greater than the CV designated in the received LB packet. If yes, in step S360, a new "designated" segment CV is inserted into a received LB packet, which carries either the default CV or a previously designated segment CV (at a previous intermediate NE in the route). In step S370, this packet is transmitted to the next NE as determined by the routing information; otherwise, (i.e., if the CV has not been changed) in step S370 the received (original) LB packet is forwarded to the next NE on the route. Steps S340 through S370 are executed by each NE along the route. If a LB packet reaches a destination NE (having in it either the default CV or the last "designated" segment CV along the respective route), the packet is sent directly to the respective source NE. For example, in route-A, LB packets are sent from source NE 110-1 through NE 120-2 and 120-3 to destination NE 110-3. From destination NE 110-3, LB packets are forwarded to source NE 110-1. A LB packet sent to the source NE does not include the route header 510, as shown in FIG. 5B. In step S380, once a LB packet is received at a source NE, the CV is extracted from the incoming packet and the Sat value is computed using the satisfaction function based on the Qocc. In step S390, given the segment CV (extracted from the received LB packet) and Sat value, the new channel bandwidth $BW_{new}$ is computed using the following equation:

$$BW_{new} = BW_{current} + F[CV, Sat]. \quad (2)$$

The function F[CV, Sat] outputs a variation of the channel bandwidth (ΔBW) to be added to or deducted from the current bandwidth of the channel. Specifically, for each CV and Sat value, the F[CV, Sat] function computes the (ΔBW), using for example a two-dimensional table. The function assures that when the queue occupancy increases (i.e., for high Sat values) the $BW_{new}$ increases and when the network congestion increases (i.e., for high CVs) the $BW_{new}$ decreases.

As an example, the CV may range between 0 and 6, and the Sat function may range between 0 and 1. An exemplary embodiment of the F function would be:

$$F[CV, Sat] = (5*Sat - CV)*100 \quad (3)$$

the result being that for CV=6, the F function is always negative, bringing about a decrease in channel bandwidth regardless of the queue occupancy as indicated by Sat. For CV=0, any non-negative value of Sat will cause the channel rate to grow. If the CV is fixed at 2, a congested channel with an initial value of Sat=1 will increase its channel bandwidth until the congestion is reduced such that Sat=0.4(0.4*5=2). The value of 100 is to scale the F function to the rate measured in Kbps.

In step S395, the computed $BW_{new}$ is input to shaper 260, which regulates the channel rate accordingly. It should be noted that the channel rate cannot be reduced below a minimum rate and cannot be increased above a maximum rate. The minimum and the maximum rates are pre-configured parameters.

Following is a non-limiting example for balancing two distributed stations. There are two source NEs A and B, NE-A configured with EIR=10,000 Kbps and transmitting at 10,000 Kbps and NE-B configured with EIR=20,000 Kbps and transmitting at 10,000 Kbps. The network bandwidth limitation is 15,000 Mbps. A weighted fair sharing rule would yield 5 Mbps for NE-A and 10 Mbps for NE-B. The disclosed method approximates this by demanding that 5*SAT=CV for both NEs A and B. Regardless of the exact value of CV, it is clear that both NE-A and NE-B should have the same Stress value, and that Stress*(EIR(A)+EIR(B)) is around 15,000, so that the mutual Stress is approximately 0.5. This indeed limits NE-A to 0.5*10000=5000 Kbps and NE-B to 0.5*20,000=10,000 Kbps. The Stability of the result is assured because the F function reduces the bandwidth when CV is high or when Sat is low.

The present invention has now been described with reference to a specific embodiment where a single queue in a channel is used. Other embodiments, where a plurality of queues connected in a channel will be apparent to those of ordinary skill in the art. In these embodiments there will be present other forms of stress and satisfaction functions however, these do not divert, and are specifically included as part of the disclosed invention.

All patents mentioned in this specification are herein incorporated in their entirety by reference into the specification, to the same extent as if each individual patent was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. In a communications network carrying a plurality of data flows through intermediate network elements (NEs) along routes, each said route connecting a source NE to a destination NE, a method for adjusting bandwidth among distributed source NEs, the method comprising:

receiving a common maximum congestion value (CV) at each source NE from a respective destination NE, wherein the common maximum CV indicates a congestion amount of a most congested intermediate NE along the respective route;

calculating a satisfaction value at each source NE based on an occupancy of a queue of each source NE; and adjusting a bandwidth of a group of said data flows transmitted through a common intermediate NE along said routes using said common maximum CV and said satisfaction value, wherein said adjusting comprises increasing the bandwidth of the group of data flows if the occupancy of the queue increases and decreasing the bandwidth of the group of data flows if the common maximum CV increases and calculating a new bandwidth $BW_{new}$ using an existing bandwidth $BW_{current}$ and a function F[CV, Sat] of said maximum CV and said satisfaction value, and wherein each of said source NEs adjusts the bandwidth of a group of said data flows transmitted through the common intermediate NE along said respective routes without communication between each of the source NEs.

2. The method of claim 1, wherein said step of receiving a common maximum CV includes:

generating a segment CV at each said intermediate NE;

comparing all said segment CVs to determine said common maximum CV; and forwarding said common maximum CV to each source NE through said respective destination NE.

3. The method of claim 2, further comprising the steps of, by each said source NE, generating load balancing (LB) packets that include a default CV, and sending each said LB packet to each said intermediate NE along a respective route.

4. The method of claim 3, wherein said generating a segment CV further includes computing a CV in each said intermediate NE, comparing said computed CV with a CV received in each LB packet, and replacing said received CV with said computed CV if said computed CV is greater, thereby providing a LB packet with a designated segment CV.

5. The method of claim 3, wherein said generating a segment CV further includes computing a CV in each said intermediate NE, comparing said computed CV with a CV received in each LB packet, and retaining said received CV if said computed CV is smaller than said received CV.

6. The method of claim 4, wherein said computing is performed based on a NE congestion value measured using a bandwidth counter and a buffer depth.

7. The method of claim 5, wherein said computing is performed based on a NE congestion value measured using a bandwidth counter and a buffer depth.

8. The method of claim 1, wherein said satisfaction value is a function of a stress value.

9. The method of claim 1, wherein said calculating is done according to the formula $BW_{new} = BW_{current} + F[CV, Sat]$.

10. The method of claim 8, wherein said satisfaction value is a non-increasing function of said stress value.

11. The method of claim 10, wherein said stress value is based on queue occupancy.

12. The method of claim 10, wherein said stress value is based on a ratio between a utilized rate of a backlogged data flow to its configured excess information rate (EIR).

13. In a communications network carrying a plurality of data flows through intermediate network elements (NEs) along routes, each said route connecting a source NE to a destination NE, a system for adjusting bandwidth among distributed source NEs comprising:
a bandwidth adjustment module, which adjusts a bandwidth of a group of data flows transmitted along each respective route, included in each of said source NEs,
wherein said bandwidth adjustment module comprises a queue and a channel module which receives a maximum congestion value indicating a congestion amount of a most congested intermediate NE along the respective route,
wherein said bandwidth adjustment module calculates a satisfaction value based on an occupancy of the queue and adjusts the bandwidth of said group of data flows using said common maximum congestion value and said respective satisfaction value, and
wherein said adjusting comprises increasing the bandwidth of said group of data flows if the occupancy of the queue increases and decreasing the bandwidth of the group of data flows if the common maximum CV increases and calculating a new bandwidth $BW_{new}$ using an existing bandwidth $BW_{current}$ and a function $F[CV, Sat]$ of said maximum CV and said satisfaction value; and
an intermediate NE shared by at least two said routes that provides a maximum congestion value to each said bandwidth adjustment module to serve in said adjusting, wherein said adjusting of bandwidth among said distributed source NEs is performed without using an external control, and without said source NEs communicating with each other.

14. The system of claim 13, wherein each said bandwidth adjustment module includes a channel module operative to execute all tasks related to balancing congestions in said network.

15. The system of claim 14, wherein said tasks include calculation of a satisfaction function and a stress function used in said fair bandwidth adjustment.

16. The system of claim 15, wherein said stress function provides a stress value and a satisfaction value determined as a non-increasing function of said stress value.

17. The system of claim 16, wherein said stress value is based on queue occupancy.

18. The system of claim 17, wherein said stress value is based on ratio between a utilized rate of a backlogged data flow and a data flow configured excess information rate EIR).

19. A method for adjusting bandwidth among distributed network elements (NEs) that include a first plurality of source NEs and a second plurality of destination NEs, each source and destination NEs connected by a route through a set of intermediate NEs, the method comprising:
generating, at each said source NE, load balancing (LB) packets that each include a default LB packet congestion value (CV), said LB packets sent to a respective destination NE through said intermediate NEs of a respective route;
generating, at each said intermediate NE along said respective route, a segment CV;
determining a common maximum CV from all segment CVs which indicates a congestion amount of a most congested intermediate NE along the respective route; and
providing, at each said source NE, a new bandwidth through a common intermediate NE along said routes using said common maximum CV and a satisfaction value calculated at each said source NE based on an occupancy of a queue of each source NE,
wherein said providing comprises providing an increased new bandwidth if the occupancy of the queue increases and providing a decreased new bandwidth if the common maximum CV increases and calculating a new bandwidth $BW_{new}$ using an existing bandwidth $BW_{current}$ and a function $F[CV, Sat]$ of said maximum CV and said satisfaction value, and
wherein each of said source NEs provides bandwidth without communication between each of the source NEs.

20. The method of claim 19, wherein said step of generating a segment CV includes generating a designated segment CV that replaces a received LB packet CV if a CV computed at said intermediate CV is larger than said received LB packet CV.

21. The method of claim 20, wherein said step of generating a segment CV includes leaving a received LB packet CV unchanged if a CV computed at said intermediate CV is smaller than said received LB packet CV.

* * * * *